(12) United States Patent
Shim et al.

(10) Patent No.: US 9,342,478 B2
(45) Date of Patent: May 17, 2016

(54) PROCESSOR WITH RECONFIGURABLE ARCHITECTURE INCLUDING A TOKEN NETWORK SIMULATING PROCESSING OF PROCESSING ELEMENTS

(75) Inventors: Heejun Shim, Seoul (KR); Sukjin Kim, Seoul (KR); Hyunchul Park, Ann Arbor, MI (US); Scott Mahlke, Ann Arbor, MI (US); Yongjun Park, Ann Arbor, MI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1082 days.

(21) Appl. No.: 12/581,229

(22) Filed: Oct. 19, 2009

(65) Prior Publication Data

US 2010/0211747 A1 Aug. 19, 2010

(30) Foreign Application Priority Data

Feb. 13, 2009 (KR) .......................... 10-2009-0012110

(51) Int. Cl.
*G06F 15/78* (2006.01)
*G06F 13/42* (2006.01)

(52) U.S. Cl.
CPC ............ *G06F 15/7867* (2013.01); *G06F 13/42* (2013.01); *Y02B 60/1207* (2013.01); *Y02B 60/1225* (2013.01)

(58) Field of Classification Search
CPC ....................................................... G06F 13/42
See application file for complete search history.

(56) References Cited

U.S. PATENT DOCUMENTS

| | | | |
|---|---|---|---|
| 5,388,223 A * | 2/1995 | Guthrie et al. | ................. 370/448 |
| 7,155,708 B2 | 12/2006 | Hammes et al. | |
| 7,711,938 B2 | 5/2010 | Wise et al. | |
| 2002/0078285 A1 | 6/2002 | Hofstee et al. | |
| 2004/0205321 A1 * | 10/2004 | Mirsky et al. | ................... 712/15 |
| 2005/0120185 A1 | 6/2005 | Yamazaki et al. | |

(Continued)

FOREIGN PATENT DOCUMENTS

| | | |
|---|---|---|
| EP | 0 930 574 | 7/1999 |
| JP | 05-219080 A | 8/1993 |
| JP | 8-70453 A | 3/1996 |

(Continued)

OTHER PUBLICATIONS

Shukla et al., "QUKU: A FPGA Based Flexible Coarse Grain Architecture Design Paradigm using Process Networks", 2007, IEEE.*

(Continued)

*Primary Examiner* — John Lindlof
(74) *Attorney, Agent, or Firm* — NSIP Law (57) ABSTRACT

Disclosed is configuration memory access technology in a processor with a reconfigurable architecture. The processor with the reconfigurable architecture includes an array of processing elements (PEs), a configuration memory and a token network. The configuration memory stores configuration data associated with controlling data flow of the respective PEs. The token network reads the configuration data from the configuration memory, estimates data flow of the PEs from the read configuration data, reads required configuration data from the configuration memory based on the estimated data flow, and supplies the required configuration data to corresponding PEs. By reducing configuration memory access frequency through a token network, power consumption may be reduced.

14 Claims, 5 Drawing Sheets

(56) References Cited

U.S. PATENT DOCUMENTS

2006/0230200 A1   10/2006   Bellows et al.
2008/0301378 A1* 12/2008   Carrie .......................... 711/147

FOREIGN PATENT DOCUMENTS

| | | |
|---|---|---|
| JP | 10334063 | 12/1998 |
| JP | 2006-508430 A | 3/2006 |
| KR | 1020060121266 | 11/2006 |
| WO | WO 2006/015868 | 2/2006 |

OTHER PUBLICATIONS

Korean Office Action issued on Jan. 21, 2015 in counterpart Korean Application No. 10-2009-0012110 (10 pages, with English translation).

* cited by examiner

| OPCODE | ALU_out | Route_out | Reg_out | waddr | raddr | const |

FIG.3B

| OPCODE | src0 | src1 | route | write | waddr | raddr | const |

FIG.4

FIG.5

PROCESSOR WITH RECONFIGURABLE ARCHITECTURE INCLUDING A TOKEN NETWORK SIMULATING PROCESSING OF PROCESSING ELEMENTS

CROSS-REFERENCE TO RELATED APPLICATION

This application claims the benefit under 35 U.S.C. §119 (a) of a Korean Patent Application No. 10-2009-0012110, filed Feb. 13, 2009, the disclosure of which is incorporated herein by reference in its entirety for all purposes.

BACKGROUND

1. Field

The following description relates to a processor with a reconfigurable architecture, and more particularly, to configuration memory access technology in a reconfigurable processor.

2. Description of the Related Art

The concept of conventional reconfigurable computing is based on a processor with reconfigurable hardware devices that are arranged in an array. Behavior of such reconfigurable hardware devices, including data flow between each of the reconfigurable hardware devices, is tailored to perform a specific task. A reconfigurable processor may have a superior processing performance comparable with dedicated hardware.

A reconfigurable hardware may also be known as a processing element (PE). A size of such a PE is called 'granularity.' A PE whose granularity is large may be termed to 'have a Coarse-Grained Reconfigurable Architecture (CGRA),' and a PE whose granularity is small may be termed to 'have a Fine-Grained Reconfigurable Architecture.'

An internal memory controller of a CGRA processor reads, per clock cycle, instructions corresponding to all PEs from a configuration memory, and supplies the instructions to the CGRA processor. However, if a large number of PEs exists, or if a word is particularly long, a configuration memory access frequency may increase, which results in an increase of power consumption of the processor.

SUMMARY

In one general aspect, there is provided a processor with a reconfigurable architecture, including an array of processing elements (PEs), a configuration memory to store configuration data associated with controlling data flow of the respective PEs, and a token network to read the configuration data from the configuration memory, estimate data flow of the PEs based on the read configuration data, read a needed configuration data part based on the estimated data flow from the configuration memory, and supply the needed configuration data part to corresponding PEs.

The configuration data stored in the configuration memory may include information indicating destinations to which processed data is to be transmitted.

Each node configuring the token network may include a control memory to generate and output a token indicating whether there is a value which is an input of a corresponding PE but is not an output of other PEs, and a node processor to receive a token from the control memory or from another node, read an instruction field required for processing the token from the configuration memory, process the token based on the instruction field, transmit the processed token to another node or remove the processed token, and supply corresponding configuration data to corresponding PEs.

All control memories included in each node of the token network may be implemented as a physically single memory.

In another general aspect, there is provided a processor with a reconfigurable architecture, including an array of a plurality of processing elements (PEs), a configuration memory to store configuration data including destination information of processed data corresponding to each PE, and a token network including a plurality of nodes and having a data flow structure corresponding to the array of the PEs, wherein each node comprises a token decoder to receive a token processed at a previous clock cycle from another node, read configuration data required to process the token from the configuration memory, and transmit the token to a destination node indicated by destination information included in the read configuration data.

Each node belonging to the token network further may include an instruction decoder to generate data flow control data based on flow information of tokens, combine the data flow control data with at least one part of a read instruction field to generate configuration data suitable for a corresponding PE, and supply the configuration data to the corresponding PE.

Each node belonging to the token network may further include a control memory to generate a token indicating whether there is a constant or an input from a register file among inputs of a corresponding PE, and output the generated token to the token network.

All control memories included in each node of the token network may be implemented as a physically single memory.

In still another general aspect, there is provided a method of controlling data flow in a reconfigurable processor, including receiving a token processed at a previous clock cycle in a token network, from another node, reading an instruction field required in a corresponding processing element (PE) to process the token, from a configuration memory, and processing the token based on the read instruction field to remove the token or output the token to a destination node.

The method may further include, at the same clock cycle as the token is received, reading a token indicating whether a constant or an input from an internal register is received, from a control memory.

Also, the method may further include at the same clock cycle as the token is removed or output to the destination node, providing a read instruction field to a corresponding PE.

The providing of the read instruction field to the corresponding PE may include outputting source selection information to an input selection multiplexer of the corresponding PE.

In yet another general aspect, there is provided a processor with a reconfigurable architecture, including an array of processing elements (PEs), a configuration memory to store configuration data associated with controlling data flow of the respective PEs, a first node to read configuration data from a configuration memory and determine a destination of a token stored therein based on the configuration data during a first clock cycle, a second node to receive the token from the first node during a second clock cycle, and a third node to read configuration data from the configuration memory, determine a destination of a token stored therein based on the configuration data during the first clock cycle, and transfer the token to the second node during the second clock cycle, such that the second node combines an instruction code with the source selection data to generate configuration data recognizable by at least one of the PEs, transfers the configuration data to the at least one PE and transfers tokens received from the configuration memory to the first node.

The tokens stored within the configuration memory may be transferred to the first node based on destination information of the tokens received from the configuration memory.

The tokens stored within the configuration memory may be transferred to the first node during a third clock cycle.

Other features will become apparent to those skilled in the art from the following detailed description, which, taken in conjunction with the attached drawings, discloses exemplary embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will likely suggest themselves to those of ordinary skill in the art. Also, descriptions of well-known functions and constructions may be omitted for increased clarity and conciseness.

Figure 1:
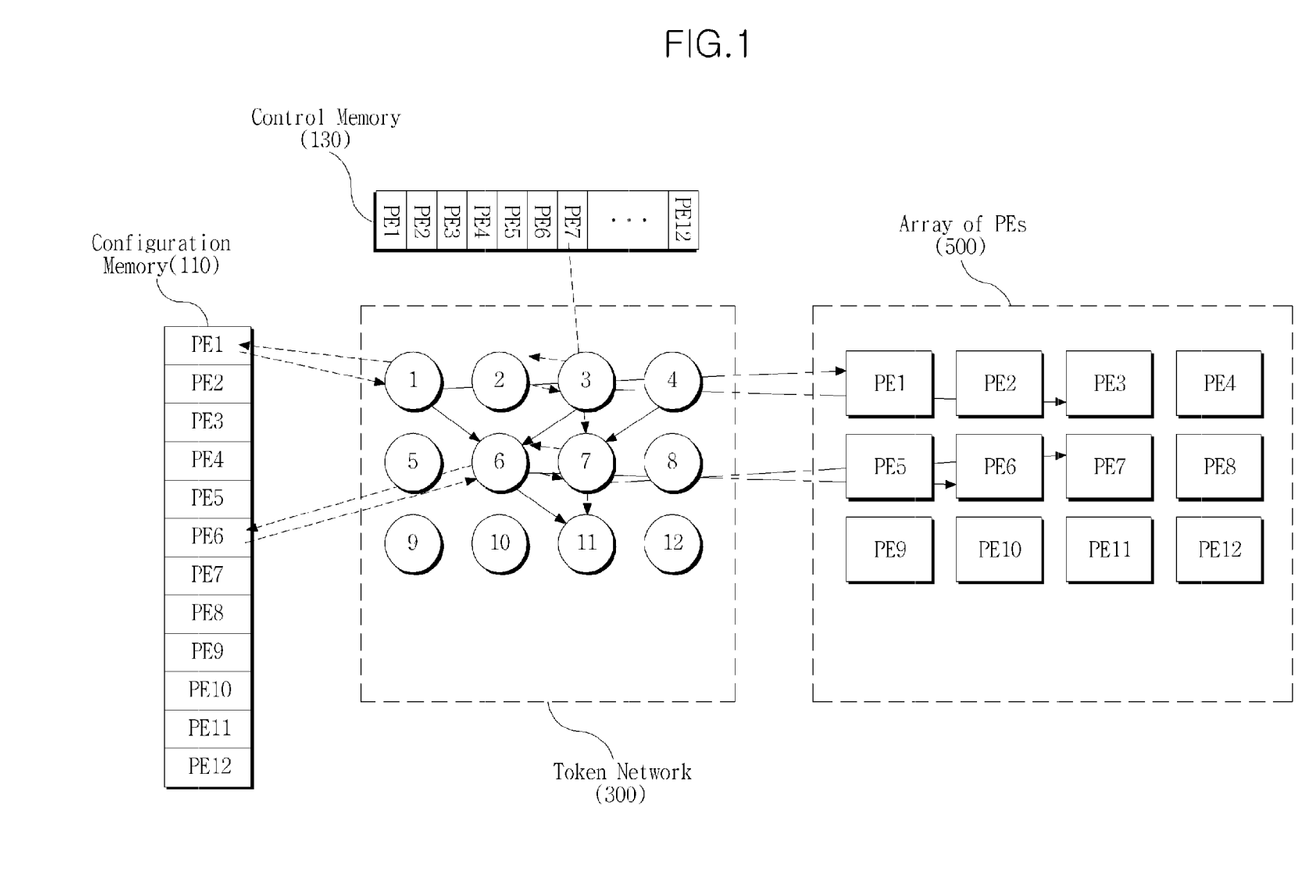
FIG. 1 is a diagram schematically illustrating components of an exemplary reconfigurable processor.

FIG. 1 illustrates components of an exemplary reconfigurable processor. As illustrated in FIG. 1, the reconfiguration processor includes an array of processing elements (PEs) 500, a configuration memory 110 which stores configuration data associated with controlling data flow of the respective PEs, and a token network 300 which reads configuration data from the configuration memory 110, estimates data flow of the PEs based on the read configuration data, reads a needed part of the configuration data from the configuration memory 110, based on the result of the estimation, and supplies the needed part of the configuration data to the corresponding PEs.

The PEs include wirings to support various combinations of data flow between each of the PEs. According to an exemplary embodiment, each PE may include all possible combinations of wirings to allow the PE to receive, at its inputs, the outputs of all the other PEs. According to another exemplary embodiment, a PE may include wirings connected to adjacent PEs to allow the PE to receive as its inputs the outputs of the adjacent PEs. In the exemplary embodiment, each PE has wirings connected to three PEs that are on a front line of the PE in order to receive, as its inputs, the outputs of the three PEs. For example, the inputs of PE6 are wired to the outputs of PE1, PE2 and PE3.

Figure 2:
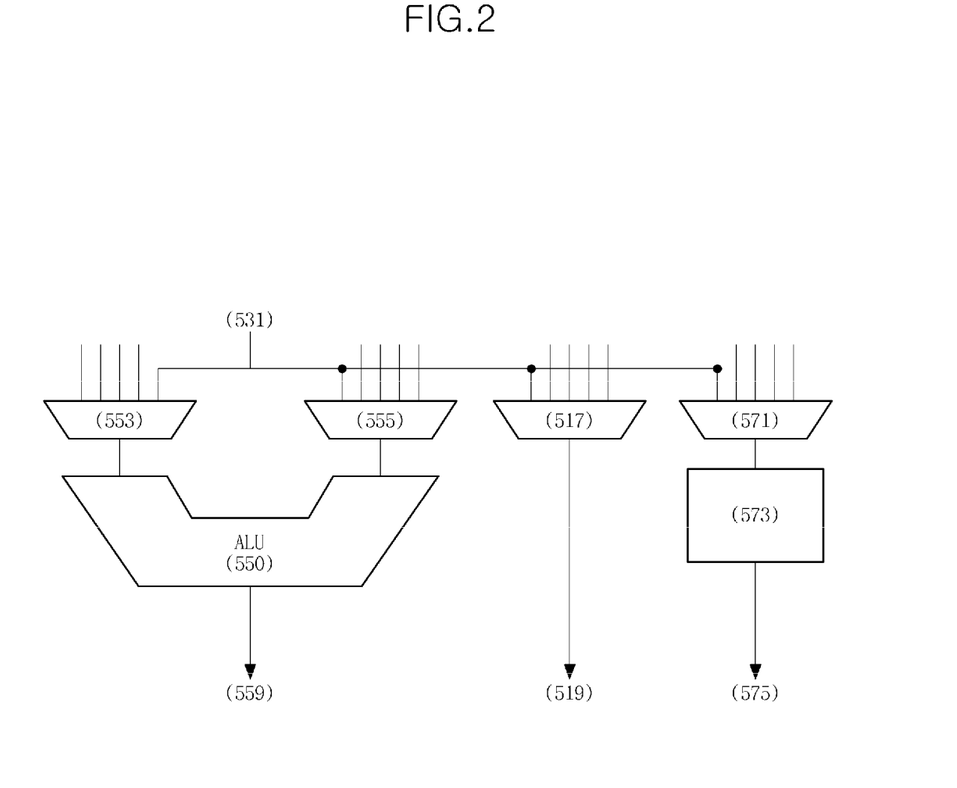
FIG. 2 is a diagram schematically illustrating a configuration of an exemplary processing element (PE).

FIG. 2 illustrates a configuration of an exemplary processing element (PE). As illustrated in FIG. 2, the exemplary PE, which may be included in a processor with a Coarse Grained Reconfigurable Architecture, includes an arithmetic logic unit (ALU) 550. The ALU 550 includes two input multiplexers 553 and 555, respectively. Also, the PE includes a multiplexer 517 to select as its input a bypass output not subjected to any processing. Also, the PE includes a multiplexer 571 to select data that is to be written at a specific address of a register array 573.

The PE includes three output terminals, including an output terminal 559 to output the results of operations by the ALU 550, a bypass output terminal 519, and an output terminal 575 to output a value read from a designated address of the register array 573.

The ALU 550 may process 8 operations, including add, subtract, shift right, shift left, logical AND, logical OR, logical NOT and logical XOR. A 3-bit input value to select one operation from among the 8 operations is included in an instruction code 'opcode.' The opcode is input as a control input to the ALU 550.

Since all the other PEs have the same number of outputs, the multiplexers 553, 555, 517 and 571 each selects one from among the 9 outputs of three PEs each having three outputs. Considering that a constant 531 may be used as another input, the multiplexers 553, 555, 517 and 571 each selects one from among 13 inputs. Accordingly, a selection control input of each multiplexer requires 4 bits.

The configuration memory 110 of FIG. 1 stores configuration data. The configuration memory 110 may store instructions corresponding to all PEs in a predetermined order, such that the instructions are stored in different fields according to blocks which the corresponding fields control. The instructions control each of the PEs which respectively correspond to the blocks. Each instruction includes an instruction code 'opcode.' Each instruction may include destination selection information to which processed data is to be transmitted.

Figure 3A:
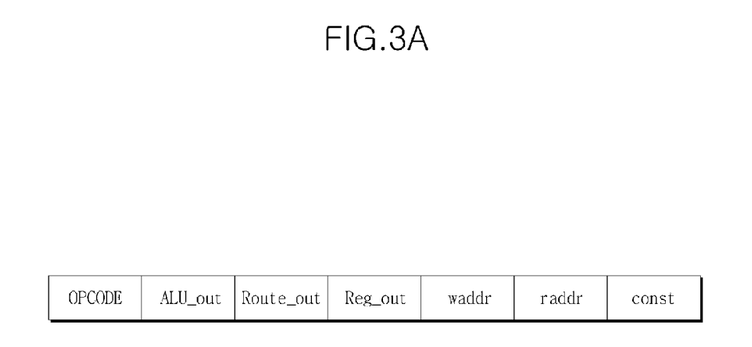
FIG. 3A is a diagram illustrating exemplary configuration data corresponding to a PE.

FIG. 3A illustrates exemplary configuration data corresponding to a PE. Since the configuration memory 110, as illustrated in FIG. 1, includes 12 PEs, 12 pieces of configuration data with the structure illustrated in FIG. 3A are stored in the configuration memory 110 per clock cycle. The configuration data may be stored in the configuration memory 110 after being compressed by variable length instruction encoding.

The variable length instruction encoding may include a method of leaving unnecessary fields as blanks and storing only necessary fields. However, in the exemplary embodiment, since each PE includes no additional component to perform decoding, configuration data to be supplied to each PE is provided in the form of decoded data. According to an aspect, such decoding may be performed in a corresponding node of the token network 300.

The token network and configuration data may be based on a manufacturer's choice method of determining destinations at outputs and receiving all signals at inputs. However, similar to a general CGRA processor, the respective PEs constructing the array of PEs 500 adopt a consumer's choice method of broadcasting outputs through output wirings and selecting corresponding signals at inputs. In the case of a token network, since the number of destinations is smaller than the number of sources and the bit width is 1, the consumer's choice method broadcasting outputs through output wirings and selecting corresponding signals at inputs may be advantageous.

Figure 3B:
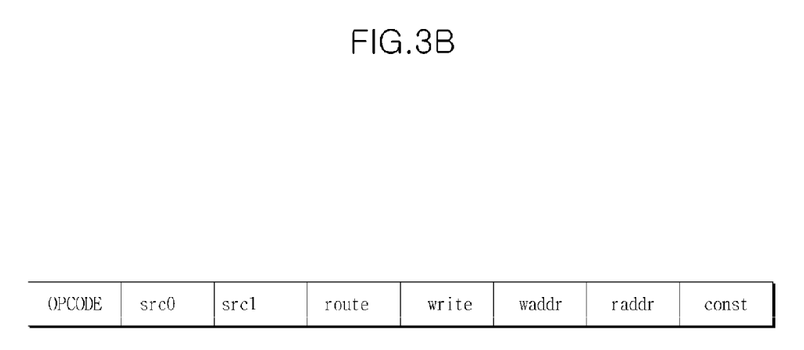
FIG. 3B is a diagram illustrating exemplary configuration data recognizable by PEs.

Now, the configuration data will be further described with reference to FIGS. 3A and 3B. In FIG. 3A, 'ALU_out' is a field which stores a value indicating which input of which PE the output of the ALU 550 is to be transferred to, 'Route_out' is a field which stores a value indicating which input of which PE the output of the bypass output terminal 519 is to be transferred to, 'Reg_out' is a field which stores a value indicating which input of which PE a value read at an address designated by a 'raddr' field of the register array 573 is to be transferred to, 'waddr' is a field which stores an address of the register array 573 at which the output of the multiplexer 571 is to be written, and 'const' is a field which stores a constant 531 which is input to the multiplexers 553, 555, 517 and 571.

Again returning to FIG. 1, the token network 300 will be further described below. The token network 300, which may be implemented as hardware, includes a plurality of nodes and has a data flow structure corresponding to an array of PEs. That is, each node denoted by a circle in the token network 300 corresponds to one of PE1 through PE12 illustrated in the left portion of FIG. 1, and connects to other nodes via the same inter-wirings as those between PE1 through PE12. However, inter-wirings between the PEs have a word width, whereas inter-wirings between the nodes have a bit width. The token network 300 simulates or estimates data flow that will be performed at the next clock cycle in the array of PEs.

Figure 4:
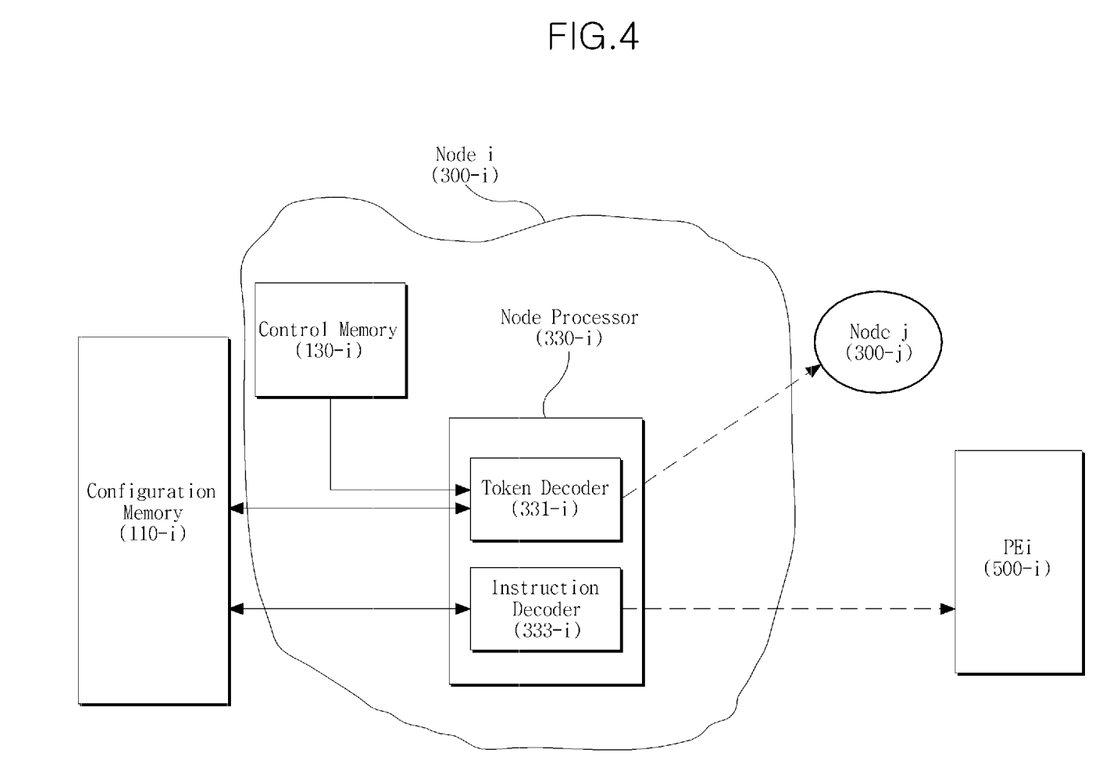
FIG. 4 is a diagram schematically illustrating a configuration of an exemplary node which belongs to a token network.

FIG. 4 illustrates a configuration of an exemplary node which belongs to the token network 300.

Referring to FIG. 4, a configuration memory 110-*i* stores configuration data including destination information of data which is processed by a PE 500-*i* corresponding to a node 300-*i*. The node 300-*i* of the token network 300 includes a node processor 330-*i* to receive a token, read an instruction field required to process the token from the configuration memory, process the token based on the instruction field and remove or transfer the token to another node, and to supply configuration data to corresponding PEs.

The node processor 330-*i* includes a token decoder 331-*i* which supplies tokens received from another node at the previous clock cycle to a destination node (300-*j* in the exemplary embodiment) according to destination information read from the configuration memory 110-*i*. Also, the node processor 330-*i* includes an instruction decoder 333-*i* to read an instruction field which may be needed at the next clock cycle by its corresponding PE 500-I, based on flow information of tokens, from the corresponding area of the configuration memory 110-*i*, and supply the instruction field to the PE 500-*i*. The token decoder 331-*i* reads required instruction fields, and the instruction decoder 333-*i* generates data flow control data, combines the data flow control data with an instruction field needed by a corresponding PE among the read instruction fields to generate configuration data suitable for the PE, and then supplies the configuration data to the PE.

Again referring to FIG. 1, a node 1 of the token network 300, at a certain clock cycle, reads a configuration data part corresponding to the clock cycle from a configuration data area corresponding to PE1 in the configuration memory 110 (See dotted lines in FIG. 1). At the same clock cycle, a node 3 reads a configuration data part corresponding to the clock cycle from a configuration data area corresponding to PE3 in the configuration memory 110 (See dotted lines in FIG. 1). The configuration data includes destination information to which the outputs of the respective PEs are to be transferred. Accordingly, the node 1 determines immediately based on the read configuration data that a token is to be transferred to a destination, for example, to the node 6. Likewise, the node 3 determines a destination of a token immediately based on the read configuration data, and transfers the token to its destination, for example, to the node 6 (See a solid line in FIG. 1).

FIG. 1, the node 6 has received two tokens from two other nodes. The token decoder of the node 6 reads configuration data from the configuration memory 110. Since the node 6 has information about where the tokens come from, the node 6 reads only a needed part among configuration data for PE6, instead of reading configuration data corresponding to all PEs. For example, if tokens have been transferred from the outputs of the ALU 550 illustrated in FIGS. 2 and 3, the waddr, raddr and Reg_out fields associated with the register array 573 and the 'const' field need not be read. The token decoder of the node 6 may determine immediately based on the value of the ALU_out field among fields included in the read configuration data that the tokens have to be transferred, for example, to the node 11 (a solid line from the node 6).

Meanwhile, the instruction decoder 333-*i* of the node 6 determines that PE6 is to receive as its inputs the outputs of PE1 and PE3, based on information representing that the instruction decoder 333-*i* has received tokens from the nodes 1 and 3. Accordingly, the instruction decoder 333-*i* may determine source selection data which includes selection control values corresponding to the two multiplexers 553 and 555, respectively, to select the inputs of the ALU 550, based on the flow information of tokens. The instruction decoder 333-*i* may combine only an opcode field among the source selection data and the fields read by the token decoder 331-*i*, with empty fields, to generate configuration data, and transmits the configuration data to PE6. An example of configuration data recognizable by PEs is illustrated in FIG. 3B. In the configuration data illustrated in FIG. 3B, 'OPCODE' is a field which stores an instruction code, 'src0' is a field which stores selection input data of the multiplexer 553, 'src1' is a field which stores selection input data of the multiplexer 555, 'route' is a field which stores selection input data of the multiplexer 517, 'write' is a field which stores selection input data of the multiplexer 571, 'waddr' is a field which stores an address to be written in the register array 573, 'raddr' is a field which stores an address to be read from the register array 573, and 'const' is a field which stores a constant 531 that is to be input to the multiplexers.

In the reconfigurable processor illustrated in FIG. 1, each node belonging to the token network may further include a control memory 130 to generate a token indicating whether there is a constant or an input from a register file among inputs of the corresponding PE, and output the token to the token network. A value which is an input of the PE but is not the output of other PEs may exist among the inputs of the PE, and this value is a constant or an input from an internal register file. In the token network, to detect the presence and/or absence of such a value, all corresponding fields of configuration data are read. Control data of the control memory 130 is generated and stored together with configuration data. That is, where a constant or an input from the internal register file exists in configuration data, '1' is set to the corresponding control data. Accordingly, the token network may generate and transfer tokens with low access frequency to the memory.

In FIG. 4, the control memory 130-*i* is illustrated to be installed for each node, but in an exemplary actual embodiment, all control memories included in each node of the token network are implemented as a physically single memory. Accordingly, at one clock cycle, access to the control memory is made once and, simultaneously, control data is supplied to all nodes that belong to the token network. Referring to FIG. 1, the node 7 receives tokens from the control memory 130 as well as from the node 4, and outputs the received tokens to the node 11.

Hereinafter, an exemplary data flow control method will be described with reference to FIG. 5. The data flow control method, which is performed by a processor with a reconfigurable architecture, includes receiving a token processed at a previous clock cycle in a token network, from another node, reading destination information of the token and an instruction field required in a corresponding processing element (PE) to process the token, from a configuration memory, and processing the token based on the read instruction field to remove the token or output the token to a destination node.

The data flow control method may further include at each node belonging to the token network, outputting source selection information to an input selection multiplexer of a PE corresponding to the node.

Figure 5:
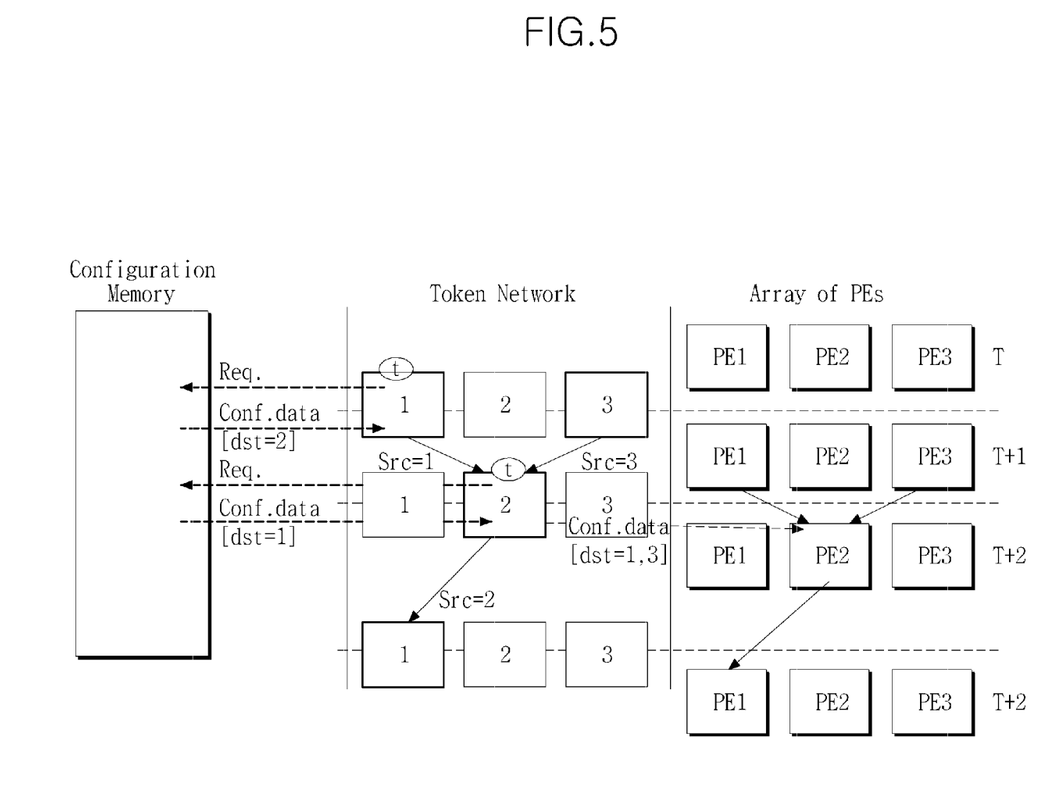
FIG. 5 is a diagram illustrating via a configuration view, an exemplary data flow control method.

For convenience of description, in FIG. 5, it is assumed that each PE has one output and one input. Accordingly, multiplexers to select source PEs determine only from which PEs the multiplexers have to receive outputs. The following description with reference to FIG. 5 focuses on the case where processing is executed between PE1, PE2 and PE3. At a time T, a node 1 of a token network reads configuration data from a configuration memory, determines a destination of a token stored therein based on the configuration data, and transfers the token to the destination, for example, to a node 2. At the same clock cycle, a node 3 of the token network reads configuration data from the configuration memory, determines a destination of a token stored therein based on the configuration data, and transfers the token to the destination, for example, to a node 2.

Then, at a time T+1, the node 2 receives the tokens transferred from the nodes 1 and 3. Since the node 2 can recognize based on the flow of tokens that sources are the nodes 1 and 3, the node 2 may generate source selection data corresponding to a PE2. Meanwhile, the node 2 combines an instruction code with the source selection data to generate configuration data recognizable by the PE2, and transfers the configuration data to the PE2. Meanwhile, the node 2 recognizes based on destination information of tokens received from the configuration memory that the tokens stored therein is to be transferred to the node 1, and performs the corresponding processing. Accordingly, at a time T+2, the tokens are transferred to the node 1.

According to example(s) described above, a reconfigurable processor may provided in which configuration memory access frequency is reduced. Accordingly, power consumption of the reconfigurable processor may be reduced.

According to example(s) described above, power consumption of the reconfigurable processor may be reduced with low hardware complexity.

According to example(s) described above, since a token network estimates data flow of an array of PEs in advance and each token is processed in units of a minimal number of bits, for example, per 1 bit, it is possible to reduce power consumption while sacrificing a relatively small chip area.

Furthermore, since the token network estimates data flow of the array of PEs in advance by one clock cycle, minimal delay as well as a decrease in access frequency to a configuration memory may be achieved.

Moreover, since decoding of instructions is performed in hardware, overhead caused by decoding may be reduced.

The methods described above including a radio communication method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor with a reconfigurable architecture, the processor comprising:
    an array of processing elements (PEs);
    a configuration memory to store configuration data associated with controlling data flow of the respective PEs; and
    a token network to read the configuration data from the configuration memory, estimate data flow of the PEs based on the read configuration data, read a configuration data part based on the estimated data flow from the configuration memory, and supply the configuration data part to corresponding PEs,
    wherein each node in the token network comprises a control memory to generate and output a one-bit token indicating whether there is a value which is an input of a corresponding PE but is not an output of any other PEs and wherein the one-bit token is output to a destination node; and
    a node processor comprising a token decoder to receive a token from the control memory or from another node, read an instruction field required to process the token from the configuration memory, process the token based on the instruction field, transmit the processed token to another node or remove the processed token, and an instruction decoder to supply corresponding configuration data to corresponding PEs, wherein the token decoder receives a token processed at a previous clock cycle from another node, and reads configuration data required to process the token from the configuration memory, and transmits the token to a destination node indicated by destination information included in the read configuration data, wherein the token network simulates processing of the PEs, and a first node of the token network corresponding to a first PE receives a token from a second node corresponding to a second PE, and the first node omits reading fields in a respective configuration memory designated to the first PE based on a simulated output port of the second PE from which the token is received, wherein, in response to the simulated output port of the second PE comprising an arithmetic logic unit (ALU) output port, the first node omits reading at least one of a bypass output field, a register file output field, and a multiplexer output field of the configuration memory designated for the first PE.

2. The processor of claim 1, wherein the configuration data stored in the configuration memory includes information indicating destinations to which processed data is to be transmitted.

3. The processor of claim 1, wherein all control memories included in each node of the token network are implemented as a single physical memory.

4. The processor of claim 1, wherein the instruction decoder generates data flow control data based on flow information of tokens, combines the data flow control data with at least one part of a read instruction field to generate configuration data suitable for a corresponding PE, and supplies the configuration data to the corresponding PE.

5. The processor of claim 1, wherein each node belonging to the token network further comprises a control memory to generate a token indicating whether there is a constant or an input from a register file among inputs of a corresponding PE, and output the generated token to the token network.

6. The processor of claim 5, wherein all control memories included in each node of the token network are implemented as a single physical memory.

7. The processor of claim 1, wherein the value is a constant.

8. The processor of claim 1, wherein the value is an input from an internal register file.

9. A method of controlling data flow in a reconfigurable processor, the method comprising:
estimating data flow of the PEs based on the read configuration data;
generating a one-bit token indicating whether there is a value which is an input of a corresponding PE but is not an output of any other PEs;
receiving the one-bit token processed at a previous clock cycle in a token network, from another node, and at the same clock cycle as the one-bit token is received, reading a token indicating whether a constant or an input from an internal register is received, from a control memory;
reading an instruction field used in a corresponding processing element (PE) to process the one-bit token, from a configuration memory; and
processing the one-bit token based on the read instruction field to output the one-bit token to a destination node, wherein the token network simulates processing of the PEs, and a first node of the token network corresponding to a first PE receives a token from a second node corresponding to a second PE, and the first node omits reading fields in a respective configuration memory designated to the first PE based on a simulated output port of the second PE from which the token is received, wherein, in response to the simulated output port of the second PE comprising an arithmetic logic unit (ALU) output port, the first node omits reading at least one of a bypass output field, a register file output field, and a multiplexer output field of the configuration memory designated or the first PE.

10. The method of claim 9, further comprising, at the same clock cycle as the one-bit token is removed or output to the destination node, providing the read instruction field to the corresponding PE.

11. The method of claim 10, wherein the providing of the read instruction field to the corresponding PE comprises outputting source selection information to an input selection multiplexer of the corresponding PE.

12. The method of claim 9, wherein the one-bit token is removed.

13. A processor with a reconfigurable architecture, the processor comprising:
an array of processing elements (PEs);
a configuration memory to store configuration data associated with controlling data flow of the respective PEs; and
a token network to read the configuration data from the configuration memory, estimate data flow of the PEs based on the read configuration data, read a configuration data part based on the estimated data flow from the configuration memory, and supply the configuration data part to corresponding PEs,
wherein each node in the token network comprises a control memory to generate and output a one-bit token indicating whether there is a value which is an input of a corresponding PE but is not an output of any other PEs and wherein the one-bit token is output to a destination node,
wherein, in response to a simulated output port of a PE comprising an arithmetic logic unit (ALU) output port, a first node omits reading at least one of a bypass output field, a register file output field, and a multiplexer output field of the configuration memory designated for a first PE.

14. A processor with a reconfigurable architecture, the processor comprising:
an array of processing elements (PEs);
a configuration memory to store configuration data associated with controlling data flow of the respective PEs; and
a token network to read the configuration data from the configuration memory, estimate data flow of the PEs based on the read configuration data, read a configuration data part based on the estimated data flow from the configuration memory, and supply the configuration data part to corresponding PEs,
wherein each node in the token network comprises a control memory to generate and output a one-bit token indicating whether there is a value which is an input of a corresponding PE but is not an output of any other PEs and wherein the one-bit token is output to a destination node, wherein the token network simulates processing of the PEs, and a first node of the token network corresponding to a first PE receives a token from a second node corresponding to a second PE, and the first node omits reading fields in a respective configuration memory designated to the first PE based on a simulated output port of the second PE from which the token is received.

\* \* \* \* \*